United States Patent [19]

Berthold

[11] 4,435,992
[45] Mar. 13, 1984

[54] ADJUSTING DEVICE FOR AXIAL AND RADIAL PISTON MACHINES

[75] Inventor: Heinz Berthold, Bildechigen, Fed. Rep. of Germany

[73] Assignee: Brueninghaus Hydraulik GmbH, Fed. Rep. of Germany

[21] Appl. No.: 232,258

[22] Filed: Feb. 6, 1981

[30] Foreign Application Priority Data

Feb. 12, 1980 [DE] Fed. Rep. of Germany ....... 3005168

[51] Int. Cl.³ .................................................. F16H 25/20
[52] U.S. Cl. .................................. 74/89.15; 74/606 R
[58] Field of Search .............. 74/89.15, 421 A, 606 R, 74/625, 626

[56] References Cited

U.S. PATENT DOCUMENTS

| 2,714,824 | 8/1955 | Schmitter | 74/421 A |
| 2,716,350 | 8/1955 | Phares | 74/421 A |
| 3,104,592 | 9/1963 | Sheesley | 74/104 |
| 3,726,155 | 4/1973 | Denkowski et al. | 74/625 |
| 4,174,621 | 11/1979 | Woltjen | 192/56 R |

FOREIGN PATENT DOCUMENTS

| 1001458 | 1/1957 | Fed. Rep. of Germany | 74/421 A |
| 2344336 | 9/1973 | Fed. Rep. of Germany | |
| 932155 | 7/1963 | United Kingdom | 74/626 |

OTHER PUBLICATIONS

Bauelemente der Ölhydraulik, Prof. Dipl.-Ing. H. Ebertshäuser (pp. 134–137).
"Hydrostatiche Getriebe" (pp. 100–101).

Primary Examiner—Lawrence J. Staab
Attorney, Agent, or Firm—Scully, Scott, Murphy & Presser

[57] ABSTRACT

An adjusting device for axial and radial piston machines, which includes an electrical servomotor, a drive, and a coupling which is arranged intermediate the drive and the setting or adjusting element for the machine. The adjusting device for the axial and radial piston machines has the servomotor arranged on one side of the adjusting element of the machine, and in which the drive and the coupling are arranged on the opposite side of the setting or adjusting element.

3 Claims, 1 Drawing Figure

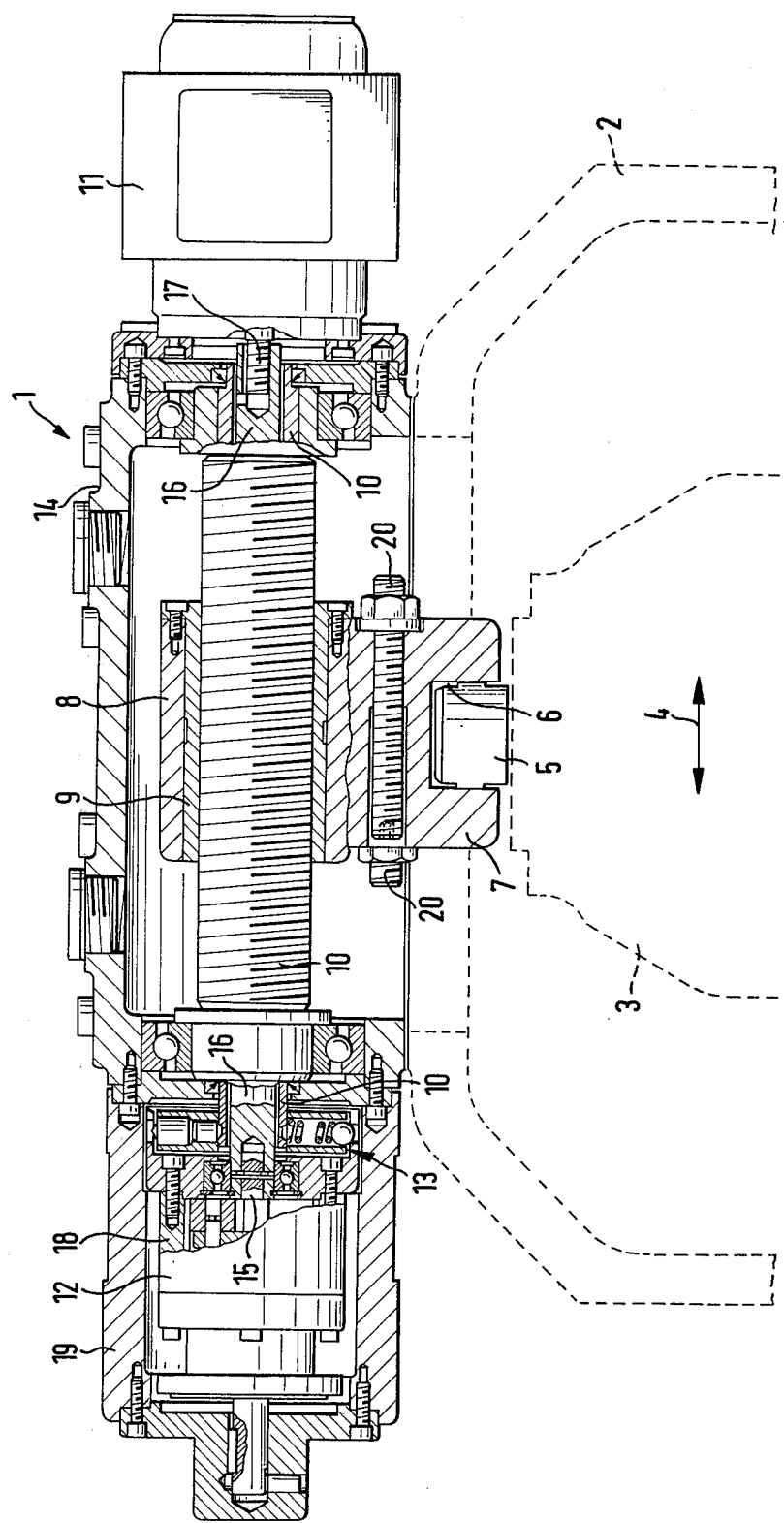

ADJUSTING DEVICE FOR AXIAL AND RADIAL PISTON MACHINES

BACKGROUND OF THE INVENTION

1. Field of the Invention

The present invention relates to an adjusting device for axial and radial piston machines, which includes an electrical servomotor, a drive, and a coupling which is arranged intermediate the drive and the setting or adjusting element for the machine.

2. Discussion of the Prior Art

Adjusting devices of that type are utilized for the varying or regulation of the volumetric setting in hydrostatic units, in which a lifting member of the hydrostatic unit is positionally displaced through the utilization of a screw spindle adjusting device. Besides a manual adjustment through the intermediary of a hand wheel it is hereby usual to provide for an adjustment by means of an electric motor which includes a reduction drive (compare with Thoma, "Hydrostatiche Getriebe", pages 100 and 101), wherein there is usually provided a coupling at the power output side of the drive for overload protection. Such drives can be constructed as starwheel drives, bevel gear drives, or planetary gear drives (refer to German Laid-open Patent Application No. 23 44 336).

In the practice the most differing adjusting speeds are required, wherein the change in the adjusting speeds can also be initially required, in essence, in machines which are in current use. Thus, in the common adjusting devices is usual to provide drives with a plurality of transmission stages which results in a higher requirement for components and a considerable constructional parameter, so that the building on of the drive arrangement for the adjusting device is carried out at the one side on the machine member, thereby rendering the entire arrangement bulky. The exchange of the electrical servomotor and/or that of the drive is a difficult labor which, particularly in dangerous surroundings, can lead to lengthy inoperative or down-time periods.

SUMMARY OF THE INVENTION

Accordingly, it is an object of the present invention to so construct an adjusting device of the above-mentioned type as to provide an overall space-saving arrangement, particularly with respect to the entire installation.

The foregoing object of the invention is attained in that the adjusting device for the axial and radial piston machines has the servomotor arranged on one side of the adjusting elements of the machine, and in which the drive and the coupling are arranged on the opposite side of the setting or adjusting element.

The present invention thus renders it possible for the invention adjusting device that the drive and/or the electromotor can presently be rapidly removed and replaced by similar components without having to contact the setting element. For example, it is possible to create an explosion-protected adjusting device in which merely the electromotor is exchanged with a mass-producable explosion-protected electromotor while the remaining components, which operate under oil or grease are not exposed to danger by explosion. Due to the comparatively symmetrical arrangement, in effect, the arrangement of the electrical servomotor on the one side and of the coupling and the drive on the other side, there is achieved a more satisfactory construction with regard to the overall dimensions of the machine.

BRIEF DESCRIPTION OF THE DRAWING

Reference may now be had to the following detailed description of an exemplary embodiment of the invention, taken in conjunction with the single FIGURE of the accompanying drawing which illustrates a longitudinal section through the inventive adjusting device.

DETAILED DESCRIPTION

The inventive adjusting device 1 is built onto the housing 2, which is shown in phantom lines, of an axial or radial piston pump. The axial or radial piston pump evidences a phantom line-drawn lifting member 3 for a variation in the volumetric setting, whose position within the housing 2 is adjustable in the directions of the double-headed arrow 4 through the intermediary of the invention adjusting device. Hereby, the lifting member is provided with a protuberance 5 which engages into a recess 6 formed in an adjusting bifurcated member 7. The bifurcated member 7 is in a portion of a follower 8 which is fastened on an adjusting nut 9. The movement of the adjusting nut 9 in the directions of the double-headed arrow 4 and, accordingly, the displacement of the lifting member 3 is effectuated through the rotation of an adjusting spindle 10 which is in engagement with the adjusting nut 9.

An electric motor 11 which serves as a servomotor is in operative connection at the input side thereof with a planetary gear drive 12, which on the output side achieves the rotational movement of the adjusting spindle 10 through the overload protective coupling 13.

As illustrated, the inventive adjusting arrangement device consists of a housing 14 in which the adjusting spindle 10 is rotatably supported and sealed with respect to the outside. In an extension of the axial direction of the adjusting spindle 10, there is detachably fastened on one side of the exterior of the housing 14 the electromotor 11, while on the opposite side of the housing 14, also in the axial direction of the adjusting spindle 10, there is detachably fastened the planetary gear drive 12, as well as the overload protective coupling 13.

For the transmission of the rotational movement of the electromotor 14 to the sun gear 15 of the planetary gear drive 12 there is provided an intermediate shaft 16 which passes coaxially through the adjusting spindle 10. The intermediate shaft 16 is detachably connected with the power output trunnion 17 of the electromotor 11, as well as being detachably connected with the sun gear 15 of the planetary gear drive 12. The cage 18 of the planetary gear drive 12 represents the output side thereof and forms an engaging side of the overload protective coupling 13 whose other engaging side is detachably connected with the adjusting spindle 10 so as to be fixed against rotation. The illustrated overload protective coupling is one of different possible constructional types; it is essential that, upon the exceeding of a predetermined torque the coupling disengages so as to prevent any damaging. The planetary gear drive 12 and the overload protective coupling 13 are arranged within a housing 19 which is detachably fastened on the housing 14 and sealed with respect to the exterior, in which there can be filled as required, lubricating media. It is also possible to fill lubricating media in the housing 14 for the adjusting spindle 10.

On the bifurcated member 7 stops 20 are provided on the left hand side and on the right hand side, by means of which there are determinable the end positions which, on the one hand define the maximum and also the minimum flow quantities of the pump and which, on the other hand, also determine the position of the lifting member 3 at which the overload protective coupling should disengage. As illustrated, these stops can be formed by threaded pins which can be positioned in bores by means of locking nuts, and which in their respective end positions come into contact with the housing 14.

The inventive arrangement of the electromotor 11 on the one side and of the coupling and drive on the other side of the adjusting spindle 10, or on the housing 14 which incorporates the adjusting element, achieves an essentially symmetrical arrangement of the entire adjusting device on housing 2 of the axial or radial piston machine, whereby the entire constructional shape is more compact and more satisfactory with respect to the external contours, as compared to the presently usual arrangement of servomotor, drive and coupling on the one side of the housing which incorporates the setting or adjusting element.

Through the inventive arrangement there is achieved a still further essential advantage. In practice there are frequently required different adjusting speeds and, thereby different rotational speeds for the adjusting spindle 10. Determined thereby is that time period during which, in the machine, in particular the pump, there must be reversely adjusted the conveyed flow between the minimum value (for example "0") and the maximum value. Changes of that type are now attainable extremely simply and rapidly since, in effect, on the one hand, the electromotor 11 is detachably fastened on the housing 14, as well as, on the other hand, the planetary gear drive 12 and also the overload protective coupling 13 are detachably fastened on the other side of the housing 14. This means that the servomotor, as well as the transmission drive and/or the coupling, can be exchanged extremely rapidly without having to contact the setting element. Under circumstances it is even possible to undertake such an exchange during the operation of the machine, and in essence then, when an actuatable latching arrangement or a manual adjustment arrangement (not shown) are provided for the adjusting spindle. The inventive adjusting device is, in particular, so constructed that upon an exchange of the electric motor 11 and/or the planetary gear drive 12 and/or the overload protective coupling, the adjusting element (formed of adjusting spindle 10, follower 8, bifurcated member 7, and lifting member 3) remain sealed with regard to the exterior, which is also very advantageous for servicing purposes. For example, through a simple exchange of the current electromotor 11 there can be constructed an explosion-protected embodiment, in effect, when a mass-produced electromotor is fastened in an explosion-protected embodiment on the housing 14, whereas the remaining components, in essence, the planetary gear drive 12, overload protective coupling 13, and adjusting element require no special constructional configuration since they do not operate in an explosion-endangered environment (lubricating medium, oil or grease).

Through the invention it is thus not to only possible to have a satisfactory constructional shape for the axial or radial piston machine which incorporates the adjusting device, but also an easily mountable and serviceable arrangement. In particular, there can be provided storageable units for the electromotor, the planetary gear drive and the overload protective coupling and, in accordance with need, rapidly mounted.

What is claimed is:

1. A motorized adjusting device for an axial and radial piston machine wherein a cylinder block is reciprocated by a setting element to control a charge delivered by the machine, said adjusting device comprising;
    (a) a housing having a threaded output shaft journaled for rotation therein, said output shaft being substantially parallel to the reciprocating axis of a cylinder block to be adjusted; said housing and said axial and radial piston machine providing a defined enclosure surrounding said output shaft and a setting means;
    (b) said setting means mounted on said threaded shaft to be reciprocated along said shaft as said shaft is rotated, said setting means engaging a cylinder block to be adjusted;
    (c) a servo motor removably mounted outside said housing and said enclosure at one end of said output shaft to provide for replacement of only the servo motor without disturbing the setting of said setting means in said shaft;
    (d) an input shaft journaled for coaxial rotation within said output shaft, said input shaft being connected to said servo motor at one end thereof;
    (e) a planetary transmission and overload protection means removably mounted outside said housing and said enclosure at the other end of said output shaft, opposite said servo motor, said overload coupling means connected between said output shaft and a cage member for said planetary transmission, said planetary transmission also having a sun gear connected to said input shaft, said transmission mounted to provide for a replacement of only the transmission and overload coupling without disturbing the setting means on said shaft; wherein rotation of the servo motor rotates said input shaft, said transmission and said overload protection device to power the rotation of said output shaft and thereby reciprocate said setting means mounted on said output shaft;
whereby either the servo motor or the transmission means may be separately removed from the housing without disturbing the enclosure surrounding said shaft and said setting element.

2. A motorized adjusting device as claimed in claim 1 which further includes an adjustable stop means mounted on said setting means to limit the range of reciprocation of said setting means.

3. A motorized adjusting device as claimed in claim 1 wherein said setting means surrounds said output shaft and has internal threads defined therein to engage the threaded portion of said output shaft, said housing also defining means for preventing the rotation of said setting means as said output shaft is rotated.

* * * * *